US011325063B2

(12) United States Patent
Li

(10) Patent No.: US 11,325,063 B2
(45) Date of Patent: May 10, 2022

(54) PRODUCTION DEVICE AND PRODUCTION METHOD OF ELECTRONIC GRADE HYDROFLUORIC ACID

(71) Applicant: Beijing University of Chemical Technology, Beijing (CN)

(72) Inventor: Qunsheng Li, Beijing (CN)

(73) Assignee: Beijing University of Chemical Technology, Beijing (CN)

(*) Notice: Subject to any disclaimer, the term of this patent is extended or adjusted under 35 U.S.C. 154(b) by 43 days.

(21) Appl. No.: 17/031,943

(22) Filed: Sep. 25, 2020

(65) Prior Publication Data

US 2021/0008489 A1    Jan. 14, 2021

(30) Foreign Application Priority Data

Aug. 31, 2020  (CN) .......................... 202010896720.6

(51) Int. Cl.
*B01D 53/14* (2006.01)
*C01B 7/19* (2006.01)

(52) U.S. Cl.
CPC ..... *B01D 53/1406* (2013.01); *B01D 53/1418* (2013.01); *B01D 53/1431* (2013.01); *B01D 53/1493* (2013.01); *C01B 7/195* (2013.01); *B01D 2252/10* (2013.01)

(58) Field of Classification Search
CPC ............ B01D 53/1406; B01D 53/1456; B01D 2252/10; B01D 53/1418; B01D 53/1493; B01D 53/1431; B01D 2257/2047; C01B 7/195; C01B 7/191; C01B 7/197
See application file for complete search history.

(56) References Cited

U.S. PATENT DOCUMENTS 3,553,938 A * 1/1971 Hirayama et al. ...... C01B 7/195
                                                    95/209
5,766,483 A * 6/1998 Luly ....................... C01B 7/195
                                                    210/670

FOREIGN PATENT DOCUMENTS

| CA | 2 298 233 A1 | * | 8/2000 | ............... B01J 19/02 |
| CN | 107 082 407 A | * | 8/2017 | ............... C01B 7/195 |
| DE | 4 402 028 A1 | * | 7/1995 | ............... C01G 1/02 |
| ES | 452 056 A1 | * | 10/1977 | ............... C01B 7/191 |
| HU | 036 551 T2 | * | 7/2018 | ............ C07C 17/395 |

* cited by examiner

Primary Examiner — Timothy C Vanoy

(57) ABSTRACT

Disclosed is a production device and production method of electronic grade hydrofluoric acid. The method includes vaporizing the raw material industrial anhydrous hydrogen fluoride by an evaporator, transporting the vaporized hydrogen fluoride to a purification tower, obtaining a high purity hydrogen fluoride gas through rectification, transporting the high purity hydrogen fluoride gas to an absorption tower for absorption by a certain concentration of hydrofluoric acid in the liquid phase, obtaining the crude electronic grade hydrofluoric acid, and obtaining the electronic grade hydrofluoric acid product through ultrapure filtration. The disclosure overcomes the technical problems of small yield and low purity of the prior art. The production process meets the requirements of environmental protection. The disclosure is suitable for industrialized large-scale production.

10 Claims, 1 Drawing Sheet

PRODUCTION DEVICE AND PRODUCTION METHOD OF ELECTRONIC GRADE HYDROFLUORIC ACID

TECHNICAL FIELD

The disclosure relates to the technical field of fine chemicals, and more specifically to a production device and production method of electronic grade hydrofluoric acid.

BACKGROUND

Electronic grade hydrofluoric acid is an inorganic acid with weakly acidic, colorless and transparent liquid under room temperature. It is volatile and has a strong pungent odor. The strong corrosiveness makes it one of the key basic chemical materials in the microelectronics industry. The purity and cleanliness of the electronic grade hydrofluoric acid have a very important impact on the yield, electrical performance and reliability of integrated circuits. According to statistics from the International Semiconductor Industry Association (SEMI), by 2020, 62 new wafer fabs will be built globally, of which 26 are in China, accounting for 42%. The global semiconductor production capacity is gradually shifting to China. The rapid development of downstream semiconductors, liquid crystal panels, and crystalline silicon solar energy will drive the demand growth for electronic grade hydrofluoric acid. It is conservatively estimated that the annual demand for electronic grade hydrofluoric acid used in the semiconductor industry will reach 40,000 tons.

The key to the preparation of electronic grade hydrofluoric acid is to control the required content and cleanliness of alkali metal, heavy metal and non-metal impurity ions. Currently, the commonly used technologies for preparing high-purity hydrofluoric acid in China and abroad include rectification, sub-boiling distillation, vacuum distillation, gas absorption and other technologies. These technologies have their own characteristics and strengths. For example, gas absorption technology can be used for large-scale production, while sub-boiling distillation technology can only be used to prepare a small number of products, and the production methods in the prior art may introduce new impurities, or have low yields, or high production costs.

It is difficult to meet industrial needs, and the waste produced during the production process pollutes the environment, and the disposal of the waste increases the production cost.

Therefore, providing a low-cost, high-efficiency, environmentally-friendly, high-purity electronic grade hydrofluoric acid production method is an urgent problem to be solved by those skilled in the art.

SUMMARY

For the reasons above, the disclosure provides a production device and production method of electronic grade hydrofluoric acid. At the same time, the byproducts are applied to the preparation of industrial grade hydrofluoric acid, without introducing additional impurities. The electronic grade hydrofluoric acid products have high yield, good quality and low cost, and the hydrogen fluoride gas is recovered in the tail gas.

In order to achieve the above objectives, the disclosure adopts the following technical solutions.

A production device of electronic grade hydrofluoric acid is provided. The production device includes a purification system. The purification system includes a raw material tank, an evaporator with an inlet connected to a bottom of the raw material tank, a purification tower with a bottom connected to an outlet of evaporator, an absorption tower with a bottom connected to a top of the purification tower, an absorption tower kettle storage tank connected to a bottom of the absorption tower. A bottom of the absorption tower kettle storage tank is sequentially connected to a first delivery pump, an ultrapure filtration device and a filling device. A raffinate storage tank is connected to a bottom of the purification tower.

Further, the production device of electronic grade hydrofluoric acid includes a reabsorption system. The reabsorption system includes a second delivery pump and a first cooler connected sequentially. The second delivery pump is connected to the bottom of the absorption tower kettle storage tank. The first cooler is connected to a top of the absorption tower.

Further, the production device of electronic grade hydrofluoric acid includes a first tail gas absorption system. The first tail gas absorption system includes a first tail gas absorption tower, a first tail gas absorption tower kettle storage tank and a third delivery pump connected sequentially. The first tail gas absorption tower is connected to the tops of the raw material tank and the absorption tower. The third delivery pump is connected to the absorption tower kettle storage tank.

Further, the first tail gas absorption system includes a fourth delivery pump and a second cooler connected sequentially. The fourth delivery pump is connected to the first tail gas absorption tower kettle storage tank. The second cooler is connected to the first tail gas absorption tower.

Electronic grade desalinated water is used in the first tail gas absorption tower to absorb hydrogen fluoride tail gas, and the generated liquid phase is used as the absorbent in the absorption tower.

The above-mentioned further solutions have the beneficial effects that the tail gas in the process is effectively treated, and environmental pollution and resource waste caused by discharged tail gas are avoided.

Further, the production device of electronic grade hydrofluoric acid includes a raffinate treatment system. The raffinate treatment system includes a Venturi ejector, a third cooler, a hydrofluoric acid cycle storage tank, and a fifth delivery pump connected sequentially. The Venturi ejector is connected to the raffinate storage tank. The fifth delivery pump delivers the processed hydrofluoric acid to an industrial grade hydrofluoric acid storage device.

Further, the raffinate treatment system includes a sixth delivery pump connected to the hydrofluoric acid cycle storage tank. The sixth delivery pump is connected to the Venturi ejector.

Further, the raffinate treatment system includes a second tail gas absorption system. The second tail gas absorption system further includes a second tail gas absorption tower, a second tail gas absorption tower kettle storage tank and a seventh delivery pump connected sequentially. The second tail gas absorption tower is connected to a top of the hydrofluoric acid cycle storage tank. The seventh delivery pump is connected to the hydrofluoric acid cycle storage tank.

Further, the second tail gas absorption system includes an eighth delivery pump and a fourth cooler connected sequentially. The eighth delivery pump is connected to the second tail gas absorption tower kettle storage tank. The fourth cooler is connected to the second tail gas absorption tower.

Among them, electronic grade desalinated water is used in the second tail gas absorption tower to absorb the hydrogen fluoride tail gas, and the absorbed liquid phase is transported to the hydrofluoric acid cycle storage tank used as the diluted absorption liquid of hydrogen fluoride.

A production method of electronic grade hydrofluoric acid is provided. The production method includes:

(1) rectification:

transporting an industrial grade anhydrous hydrofluoric acid to the raw material tank, pressurizing the industrial grade anhydrous hydrofluoric acid to 1-10 atm by a compressed nitrogen in the raw material tank, transporting the pressurized hydrofluoric acid to the evaporator for gasification, the gasified hydrogen fluoride entering the bottom of the purification tower;

processing, by the purification tower, the gasified hydrogen fluoride and obtaining high purity hydrogen fluoride gas on top of the purification tower, entering the high purity hydrogen fluoride gas into the absorption tower;

discharging the industrial grade hydrofluoric acid from the bottom of the absorption tower into the raffinate storage tank, processing the discharged industrial grade hydrofluoric acid containing in the raffinate storage tank by the raffinate treatment system, and obtaining an industrial grade hydrofluoric acid;

(2) absorption:

entering the high purity hydrogen fluoride gas into the absorption tower from the bottom of the absorption tower, filling 30% wt-95% wt of liquid phase hydrofluoric acid into the top of the absorption tower, discharging the tail gas from the top of the absorption tower into the first tail gas absorption system for processing after a mass transferring through contacting, and entering the transferred hydrofluoric acid from a bottom output of the absorption tower to the absorption tower kettle storage tank;

(3) ultrapure filtration or reabsorption:

measuring a concentration of the hydrofluoric acid entering the absorption tower kettle storage tank, pumping the hydrofluoric acid into the ultrapure filtration device through the first delivery pump when a concentration of 50% wt is reached, obtaining an electronic grade hydrofluoric acid after being processed by the ultrapure filtration device, transporting the electronic grade hydrofluoric acid to the filling device for storage, reabsorbing the hydrofluoric acid, by the reabsorption system, and returning to the absorption tower for processing when a concentration of the hydrofluoric acid is less than 50% wt.

Further, the processing of the raffinate treatment system in the step (1) includes:

(1.1) Venturi ejector absorption;

transporting the hydrogen fluoride in the raffinate storage tank to the Venturi ejector; diluting and absorbing the hydrogen fluoride in the raffinate storage tank by the 30% wt-90% wt hydrofluoric acid liquid in the Venturi ejector;

(1.2) cooling, by the third cooler, the hydrogen fluoride absorbed by the Venturi ejector and transporting the cooled hydrogen fluoride to the hydrofluoric acid cycle storage tank;

(1.3) storage or recycle;

measuring the concentration of the hydrofluoric acid entering into the hydrofluoric acid cycle storage tank;

transporting, by the fifth delivery pump, the hydrofluoric acid in the hydrofluoric acid cycle storage tank defined as a finished industrial grade hydrofluoric acid to the industrial grade hydrofluoric acid storage device for storage when a concentration of 55% wt is reached;

pumping, by the sixth delivery pump, the hydrofluoric acid in the hydrofluoric acid cycle storage tank to the Venturi ejector when a concentration of the hydrofluoric acid is less than 50% wt and absorbing, by the Venturi ejector, the pumped hydrofluoric acid continually; entering the tail gas discharged from the top of the hydrofluoric acid cycle storage tank into the second tail gas absorption system, and processing the tail gas.

Compared with the prior art through the above technical solutions, the disclosure provides a production device and production method of electronic grade hydrofluoric acid. The purification process is reduced by using Class II superior grade industrial anhydrous hydrofluoric acid as the raw material. During the production of electronic grade hydrofluoric acid, a very small amount of hydrogen fluoride that has not been dissolved and absorbed by the desalinated water is recovered by the secondary absorption of high purity desalinated water to improve the utilization rate of hydrogen fluoride. No waste gas in the production of hydrofluoric acid. During the production of electronic grade hydrofluoric acid, the process is physical mixing without chemical reaction. All the water for producing in the project enters the product, and no wastewater is produced. The annual production scale of electronic grade hydrofluoric acid produced by the technical scheme of the disclosure reaches 25000 tons of EL-grade hydrofluoric acid, 5000 tons of UPS-grade hydrofluoric acid. And byproduct industrial grade hydrofluoric acid reaches 7750 tons of per year. The technical scheme has high economic benefits and environmental protection significance.

BRIEF DESCRIPTION OF THE DRAWINGS

In order to describe the embodiments of the disclosure or the technical solutions in the prior art more clearly, the following drawings that need to be used in the description of the embodiments or the prior art will be briefly introduced. Obviously, the drawings in the following description are only embodiments of the disclosure. For those of ordinary skill in the art, other drawings can be obtained based on the drawings disclosed without creative work.

DETAILED DESCRIPTION OF EMBODIMENTS

Certain exemplary embodiments will now be described to provide an overall understanding of the principles of the structure, function, manufacture, and use of the instruments and methods disclosed herein. One or more examples of these embodiments are illustrated in the accompanying drawings. Those skilled in the art will understand that the instruments and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Figure 1:
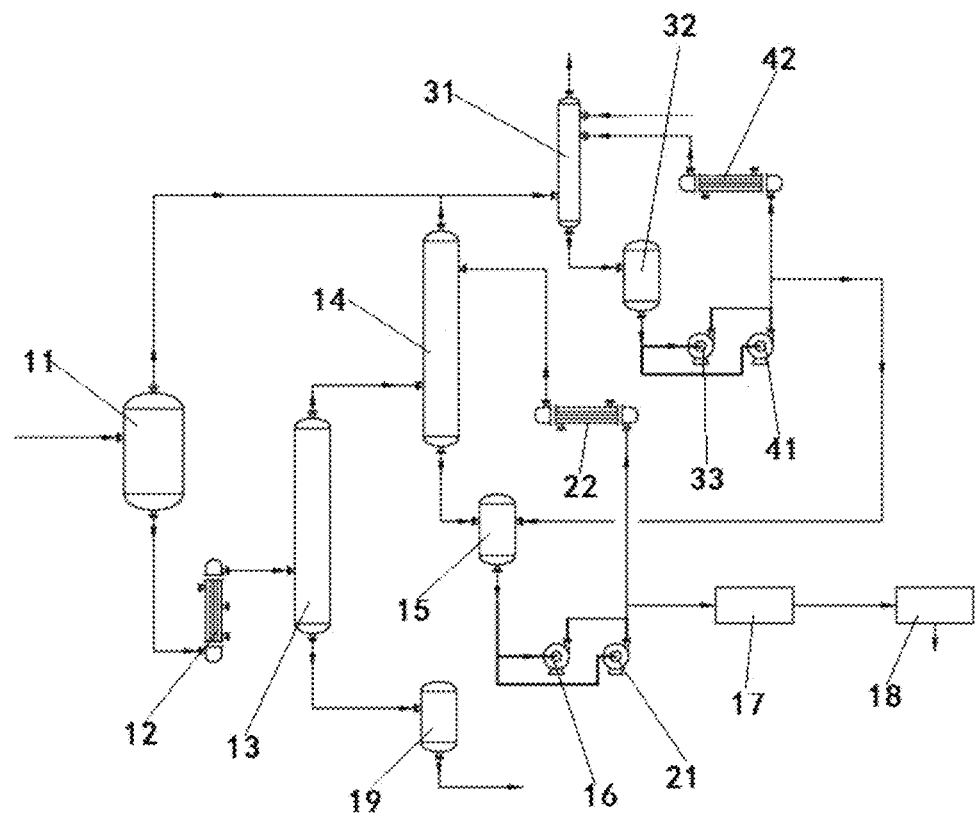
FIG. 1 is a structural diagram of a production device of electronic grade hydrofluoric acid of the disclosure.

Referring to FIG. 1, a production device of electronic grade hydrofluoric acid is provided. The production device includes a purification system, a reabsorption system and a first tail gas absorption system.

The purification system includes a raw material tank 11, an evaporator 12 with an inlet connected to a bottom of the raw material tank 11, a purification tower 13 with a bottom connected to an outlet of evaporator 12, an absorption tower 14 with a bottom connected to a top of the purification tower 13, an absorption tower kettle storage tank 15 connected to a bottom of the absorption tower 14. A bottom of the absorption tower kettle storage tank 15 is sequentially connected to a first delivery pump 16, an ultrapure filtration device 17 and a filling device 18. A raffinate storage tank 19 is connected to a bottom of the purification tower 13.

The operating process of the above device is:

(1) rectification:

transporting an industrial grade anhydrous hydrofluoric acid to the raw material tank 11, pressurizing the industrial grade anhydrous hydrofluoric acid to 1-10 atm by a compressed nitrogen in the raw material tank 11, transporting the pressurized hydrofluoric acid to the evaporator 12 for gasification, the gasified hydrogen fluoride entering the bottom of the purification tower 13;

processing, by the purification tower 13, the gasified hydrogen fluoride, and obtaining high purity hydrogen fluoride gas on top of the purification tower 13; entering the high purity hydrogen fluoride gas into the absorption tower 14;

discharging the industrial grade hydrofluoric acid from the bottom of the absorption tower 14 into the raffinate storage tank 19, processing the discharged industrial grade hydrofluoric acid containing in the raffinate storage tank 19 by the raffinate treatment system, and obtaining an industrial grade hydrofluoric acid;

(2) absorption:

entering the high purity hydrogen fluoride gas into the absorption tower 14 from the bottom of the absorption tower 14, filling 30% wt-95% wt of liquid phase hydrofluoric acid into the top of the absorption tower 14, discharging the tail gas from the top of the absorption tower 14 into the first tail gas absorption system for processing after a mass transferring through contacting, and entering the transferred hydrofluoric acid from a bottom output of the absorption tower 14 to the absorption tower kettle storage tank 15;

(3) ultrapure filtration or reabsorption:

measuring a concentration of the hydrofluoric acid entering the absorption tower kettle storage tank 15, pumping the hydrofluoric acid into the ultrapure filtration device 17 through the first delivery pump 16 when a concentration of 50% wt is reached, obtaining an electronic grade hydrofluoric acid after being processed by the ultrapure filtration device 17, transporting the electronic grade hydrofluoric acid to the filling device 18 for storage, reabsorbing the hydrofluoric acid, by the reabsorption system, and returning to the absorption tower 14 for processing when a concentration of the hydrofluoric acid is less than 50% wt.

Figure 2:
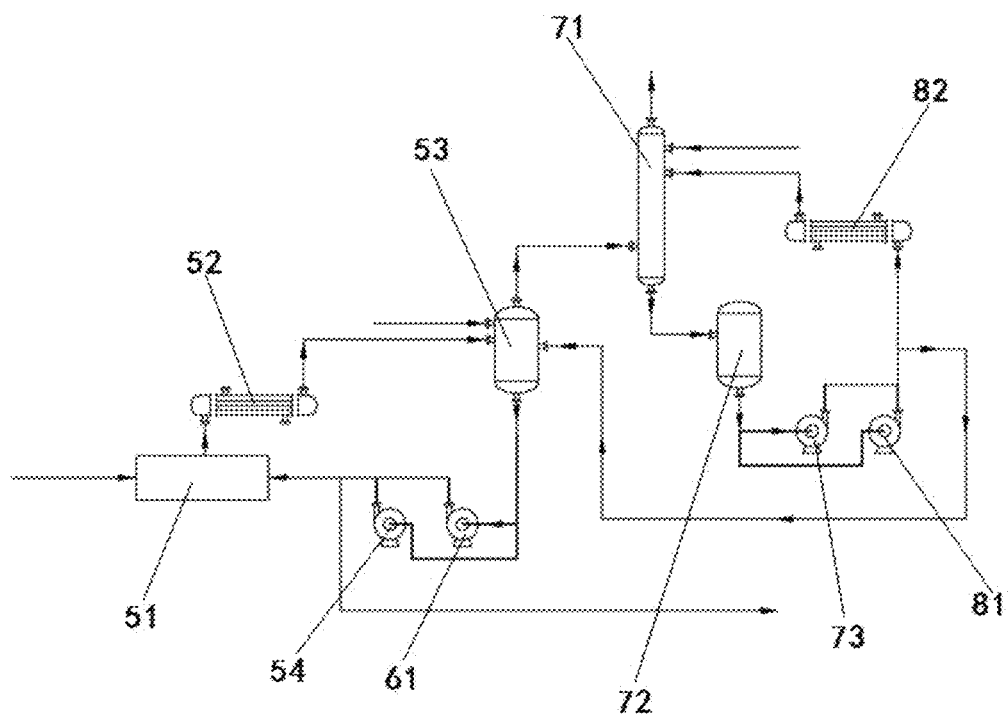
FIG. 2 is a structural diagram of a raffinate treatment system of the production device of electronic grade hydrofluoric acid of the disclosure.

Referring to FIG. 2, the raffinate treatment system in the step (1) includes a Venturi ejector 51, a third cooler 52, a hydrofluoric acid cycle storage tank 53, and a fifth delivery pump 54 connected sequentially. The Venturi ejector 51 is connected to the raffinate storage tank 19. The fifth delivery pump 54 delivers the processed hydrofluoric acid to an industrial grade hydrofluoric acid storage device.

The operating process of the raffinate treatment system is:

(1.1) Venturi ejector absorption;

transporting the hydrogen fluoride in the raffinate storage tank 19 to the Venturi ejector 51; diluting and absorbing the hydrogen fluoride in the raffinate storage tank 19 by the 30% wt-90% wt hydrofluoric acid liquid in the Venturi ejector 19;

(1.2) cooling, by the third cooler 52, the hydrogen fluoride absorbed by the Venturi ejector 51 and transporting the cooled hydrogen fluoride to the hydrofluoric acid cycle storage tank 53;

(1.3) storage or recycle;

measuring the concentration of the hydrofluoric acid entering into the hydrofluoric acid cycle storage tank 53;

defining the hydrofluoric acid in the hydrofluoric acid cycle storage tank 53 as a finished industrial grade hydrofluoric acid when a concentration of 55% wt is reached transporting, by the fifth delivery pump 54, the finished industrial grade hydrofluoric acid to the industrial grade hydrofluoric acid storage device for storage; pumping the hydrofluoric acid in the hydrofluoric acid cycle storage tank 53 to the Venturi ejector 51 when a concentration of the hydrofluoric acid is less than 50% wt, absorbing the pumped hydrofluoric acid continually, entering the tail gas discharged from the top of the hydrofluoric acid cycle storage tank 53 into the second tail gas absorption system, and processing the tail gas.

Referring to FIG. 1, a first tail gas absorption system includes a first tail gas absorption tower 31, a first tail gas absorption tower kettle storage tank 32 and a third delivery pump 33 connected sequentially. The first tail gas absorption tower 31 is connected to the tops of the raw material tank 11 and the absorption tower 14. The third delivery pump 33 is connected to the absorption tower kettle storage tank 15. The first tail gas absorption system further includes a fourth delivery pump 41 and a second cooler 42 connected sequentially. The fourth delivery pump 41 is connected to the first tail gas absorption tower kettle storage tank 32. The second cooler 42 is connected to the first tail gas absorption tower 31. The electronic grade desalinated water is used in the first tail gas absorption tower 31 to absorb hydrogen fluoride tail gas, and the absorbed liquid phase is used as the absorbent in the absorption tower 14. The operating process of the first tail gas absorption system is:

the tail gas from the connection of the top of the raw material tank 11 and the top of the absorption tower 14 entering the first tail gas absorption tower 31 and entering the first tail gas absorption tower tank 32 after the electronic grade desalinated water absorption treatment in the first tail gas absorption tower 31, pumping part of the processed tail gas into the absorption tower kettle storage tank 15 by the third delivery pump 33 as reusing absorbent of the absorption tower 14, pumping the other part of the processed tail gas into the first tail gas absorption tower 31 again through the second cooler 42 by the fourth delivery pump 41 for processing.

Referring to FIG. 1, a reabsorption system includes a second delivery pump 21 and a first cooler 22 connected sequentially. The second delivery pump 21 is connected to the bottom of the absorption tower kettle storage tank 15. The first cooler 22 is connected to a top of the absorption tower 14. The hydrofluoric acid whose concentration does not reach 50% wt is pumped back into the top of the absorption tower 14 by the second delivery pump 21 through the first cooler 22 for processing again.

Referring to FIG. 2, the raffinate treatment system further includes a sixth delivery pump 61 connected to the hydrofluoric acid cycle storage tank 53. The sixth delivery pump 61 is connected to the Venturi ejector 51. The hydrofluoric acid whose concentration does not reach 55% wt is pumped to the Venturi ejector 51 by the sixth delivery pump 61 for continued absorption.

Referring to FIG. 2, a second tail gas absorption system in the step (1.3) includes a second tail gas absorption tower 71, a second tail gas absorption tower kettle storage tank 72 and a seventh delivery pump 73 connected sequentially. The second tail gas absorption tower 71 is connected to a top of the hydrofluoric acid cycle storage tank 53. The seventh delivery pump 73 is connected to the hydrofluoric acid cycle storage tank 53. The second tail gas absorption system further includes an eighth delivery pump 81 and a fourth cooler 82 connected sequentially. The eighth delivery pump 81 is connected to the second tail gas absorption tower kettle storage tank 72. The fourth cooler 82 is connected to the second tail gas absorption tower 71.

The operating process of the first tail gas absorption system is:

the tail gas from the top of hydrofluoric acid cycle storage tank 53 entering the second tail gas absorption tower 71 and entering the second tail gas absorption tower tank 72 after the electronic grade desalinated water absorption treatment in the second tail gas absorption tower 71, pumping part of the processed tail gas into the hydrofluoric acid cycle storage tank 53 by the seventh delivery pump 73 as the diluted absorption liquid of hydrogen fluoride, pumping the other part of the processed tail gas into the second tail gas absorption tower 71 again through the fourth cooler 82 by the eighth delivery pump 81 for processing.

The various embodiments in this specification are described in a progressive manner. Each embodiment focuses on the differences from other embodiments, and the same or similar parts among the various embodiments can be referred to each other. For the device disclosed in the embodiment, since it corresponds to the method disclosed in the embodiment, the description is relatively simple, and the relevant part can be referred to the description of the method part.

The above description of the disclosed embodiments enables those skilled in the art to implement or use the disclosure. Various modifications to these embodiments will be obvious to those skilled in the art, and the general principles defined herein can be implemented in other embodiments without departing from the spirit or scope of the disclosure. Therefore, the disclosure will not be limited to the embodiments shown in this document, but should conform to the widest scope consistent with the principles and novel features disclosed in this document.

The invention claimed is:

1. A production device of electronic grade hydrofluoric acid, comprising a purification system; wherein the purification system comprises a raw material tank, an evaporator with an inlet connected to a bottom of the raw material tank, a purification tower with a bottom connected to an outlet of evaporator, an absorption tower with a bottom connected to a top of the purification tower, an absorption tower kettle storage tank connected to a bottom of the absorption tower; a bottom of the absorption tower kettle storage tank is sequentially connected with a first delivery pump, an ultra-pure filtration device and a filling device; and a raffinate storage tank is connected to a bottom of the purification tower.

2. The production device of claim 1, further comprising a reabsorption system; wherein the reabsorption system comprises a second delivery pump and a first cooler connected sequentially; the second delivery pump is connected to the bottom of the absorption tower kettle storage tank; and the first cooler is connected to a top of the absorption tower.

3. The production device of claim 1, further comprising a first tail gas absorption system; wherein the first tail gas absorption system comprises a first tail gas absorption tower, a first tail gas absorption tower kettle storage tank and a third delivery pump connected sequentially; the first tail gas absorption tower is connected to the top of the raw material tank and the absorption tower; and the third delivery pump is connected to the absorption tower kettle storage tank.

4. The production device of claim 3, wherein the first tail gas absorption system further comprises a fourth delivery pump and a second cooler connected sequentially; the fourth delivery pump is connected to the first tail gas absorption tower kettle storage tank; and the second cooler is connected to the first tail gas absorption tower.

5. The production device of claim 1, further comprising a raffinate treatment system; wherein the raffinate treatment system comprises a Venturi ejector, a third cooler, a hydrofluoric acid cycle storage tank, and a fifth delivery pump connected sequentially, the Venturi ejector is connected to the raffinate storage tank, and the fifth delivery pump is configured to deliver a processed hydrofluoric acid to an industrial grade hydrofluoric acid storage device.

6. The production device of claim 5, wherein the raffinate treatment system further comprises a sixth delivery pump connected to the hydrofluoric acid cycle storage tank; and the sixth delivery pump is connected to the Venturi ejector.

7. The production device of claim 5, wherein the raffinate treatment system further comprises a second tail gas absorption system; the second tail gas absorption system further comprises a second tail gas absorption tower, a second tail gas absorption tower kettle storage tank and a seventh delivery pump connected sequentially; the second tail gas absorption tower is connected to a top of the hydrofluoric acid cycle storage tank; and the seventh delivery pump is connected to the hydrofluoric acid cycle storage tank.

8. The production device of claim 7, wherein the second tail gas absorption system further comprises an eighth delivery pump and a fourth cooler connected sequentially; the eighth delivery pump is connected to the second tail gas absorption tower kettle storage tank; and the fourth cooler is connected to the second tail gas absorption tower.

9. A production method of the electronic grade hydrofluoric acid, comprising:

(1) rectification:

transporting an industrial grade anhydrous hydrofluoric acid to the raw material tank, pressurizing the industrial grade anhydrous hydrofluoric acid to 1-10 atm by a compressed nitrogen in the raw material tank, transporting the pressurized hydrofluoric acid to the evaporator for gasification, the gasified hydrogen fluoride entering the bottom of the purification tower;

processing, by the purification tower, the gasified hydrogen fluoride and obtaining high purity hydrogen fluoride gas on top of the purification tower, entering the high purity hydrogen fluoride gas into the absorption tower;

discharging the industrial grade hydrofluoric acid from the bottom of the absorption tower into the raffinate storage tank, processing the discharged industrial grade hydrofluoric acid containing in the raffinate storage tank by the raffinate treatment system, and obtaining an industrial grade hydrofluoric acid;

(2) absorption:

entering the high purity hydrogen fluoride gas into the absorption tower from the bottom of the absorption tower, filling 30% wt-95% wt of liquid phase hydrofluoric acid into the top of the absorption tower, discharging the tail gas from the top of the absorption tower into the first tail gas absorption system for processing after a mass transferring through contacting, and entering the transferred hydrofluoric acid from a bottom output of the absorption tower to the absorption tower kettle storage tank;

(3) ultrapure filtration or reabsorption:

measuring a concentration of the hydrofluoric acid entering the absorption tower kettle storage tank, pumping the hydrofluoric acid into the ultrapure filtration device through the first delivery pump when a concentration of 50% wt is reached, obtaining an electronic grade hydrofluoric acid after being processed by the ultrapure filtration device, transporting the electronic grade hydrofluoric acid to the filling device for storage, reabsorbing the hydrofluoric acid, by the reabsorption system, and returning to the absorption tower for processing when a concentration of the hydrofluoric acid is less than 50% wt.

10. The production method of claim 9, wherein the processing of the raffinate treatment system in the step (1) further comprises:

(1.1) Venturi ejector absorption;

transporting the hydrogen fluoride in the raffinate storage tank to the Venturi ejector;

diluting and absorbing the hydrogen fluoride in the raffinate storage tank by the 30% wt-90% wt hydrofluoric acid liquid in the Venturi ejector;

(1.2) cooling, by the third cooler, the hydrogen fluoride absorbed by the Venturi ejector and transporting the cooled hydrogen fluoride to the hydrofluoric acid cycle storage tank;

(1.3) storage or recycle;

measuring the concentration of the hydrofluoric acid entering into the hydrofluoric acid cycle storage tank;

transporting, by the fifth delivery pump, the hydrofluoric acid in the hydrofluoric acid cycle storage tank defined as a finished industrial grade hydrofluoric acid to the industrial grade hydrofluoric acid storage device for storage when a concentration of 55% wt is reached;

pumping, by the sixth delivery pump, the hydrofluoric acid in the hydrofluoric acid cycle storage tank to the Venturi ejector when a concentration of the hydrofluoric acid is less than 50% wt and absorbing, by the Venturi ejector, the pumped hydrofluoric acid continually, entering the tail gas discharged from the top of the hydrofluoric acid cycle storage tank into the second tail gas absorption system, and processing the tail gas.

\* \* \* \* \*